(12) United States Patent
Seal

(10) Patent No.: US 6,314,443 B1
(45) Date of Patent: Nov. 6, 2001

(54) DOUBLE/SATURATE/ADD/SATURATE AND DOUBLE/SATURATE/SUBTRACT/SATURATE OPERATIONS IN A DATA PROCESSING SYSTEM

(75) Inventor: David James Seal, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 09/196,213

(22) Filed: Nov. 20, 1998

(51) Int. Cl.$^7$ .................................................. G06F 9/302
(52) U.S. Cl. .............................................. 708/552; 708/523
(58) Field of Search .................................. 708/552, 523, 708/501, 498; 712/221

(56) References Cited

U.S. PATENT DOCUMENTS

| | | | |
|---|---|---|---|
| 5,652,910 | 7/1997 | Boutaud et al. | 712/218 |
| 5,687,289 | 11/1997 | Viot et al. | 706/4 |
| 6,078,940 | * 6/2000 | Scales | 708/552 |
| 6,108,772 | * 8/2000 | Sharangpani | 708/552 |

FOREIGN PATENT DOCUMENTS

| | | |
|---|---|---|
| 0 766 169 | 4/1997 | (EP) . |
| 0 845 741 | 6/1998 | (EP) . |
| 2 317 465 | 3/1998 | (GB) . |
| WO 97/23822 | 7/1997 | (WO) . |
| WO 97/31308 | 8/1997 | (WO) . |

OTHER PUBLICATIONS

J. Bedu, "Le DSP TMS 320C25 Texas Instruments" Electronique Radio Plans, No. 541, 12/1992, pp. 82–86.

W. Sung, "An Automatic Scaling Method for the Programming of Fixed–Point Digital Signal Processors" Signal Image and Video Processing, 1991 IEEE Int'l Symposium on Circuits and Systems, Jun. 1991.

* cited by examiner

Primary Examiner—David H. Malzahn
(74) Attorney, Agent, or Firm—Nixon & Vanderhye P.C.

(57) ABSTRACT

A data processing system is provided for supporting saturating arithmetic using input operands of the Q31 and Q15 type. In order to accommodate this type of operation applied to multiply accumulate or multiply subtract instructions, additional instructions QDADD, QDSUB and QDRSB are provided, QDADD provides the function of double/saturate/add/saturate. QDSUB and QDRSB provide respective operand orderings of double/saturate/subtract/saturate operations. Providing these special purpose instructions within the instruction set allows the required saturation and adjustments to be provided for Q31 and Q15 operands whilst not imposing additional delays and complication onto the main data paths required for the rest of the processing operations.

15 Claims, 4 Drawing Sheets

US 6,314,443 B1

DOUBLE/SATURATE/ADD/SATURATE AND DOUBLE/SATURATE/SUBTRACT/SATURATE OPERATIONS IN A DATA PROCESSING SYSTEM

BACKGROUND OF THE INVENTION

1. Field of the Invention

This invention relates to data processing systems. More particularly, this invention relates to data processing systems for performing arithmetic operations suitable for performing saturated arithmetic operations.

2. Description of the Prior Art

Many DSP algorithms use what is sometimes known as Q15 arithmetic and Q31 arithmetic. A Q15 number is an ordinary 16-bit 2's complement integer, but is regarded as representing that integer divided by $2^{15}$. Since a 16-bit 2's complement integer can represent numbers from $-2^{15}$ to $+2^{15}-1$, a Q15 can represent numbers from $-1$ to $+(1-2^{-15})$.

Similarly, a Q31 number is an ordinary 32-bit 2i's complement integer, regarded as being divided by $2^{31}$, and is able to represent numbers from $-1$ to $+(1-2^{-31})$. (N+1)-bit QN numbers can be defined analogously for any other value of N.

An important feature of Q15 and Q31 arithmetic is that they are "saturating". If the mathematical arithmetic result of an operation exceeds the maximum positive value $(+1-2^{-N})$, then the saturated result is the maximum positive value; similarly, if the mathematical result is less than $-1$, then the saturated result is $-1$. For example, in Q15 arithmetic, if A=0x8000 (representing $-1$) and B=0xC0000 (representing $-0.5$), then adding A and B will produce a result of 0x8000 (representing $-1$) rather than the normal 16-bit 2's complement result of 0x4000.

A highly desirable and commonly occurring operation in DSP algorithms is a "multiply-accumulate", i.e. a multiplication of two operands followed by the additional of a third operand:

$$\text{Result} = (A*B) + C$$

Significant problems arise when wishing to provide such multiply-accumulate instructions for saturated (sometimes known as clipped) arithmetic. This is particularly the case when performing arithmetic on QN numbers.

In order to accommodate the various different types of instruction in both saturated and non-saturated form a considerable amount of opcode bit space is required. Furthermore, when seeking to provide single cycle multiply performance, the additional burden of having to cope with the requirements for saturation and associated adjustments is such that the clock speed is undesirably limited by the worst-case saturated multiply instruction.

SUMMARY OF THE INVENTION

Viewed from one aspect the present invention provides data processing apparatus comprising.

(i) an instruction decoder responsive to data processing instruction words to generate processing control signals; and (ii) processing logic controlled by said processing control signals to perform data processing operations upon data operand words; wherein (iii) said instruction decoder is responsive to a first instruction word to generate control signals to control said processing logic to perform a data processing operation upon a first N-bit data operand word P and a second N-bit data operand word Q to generate a result N-bit data word R as given by:

$$R = \text{Sat (Fun (P)} + Q),$$

where

Sat (X) is a function returning a saturated value of X, and

Fun (X) is a function operative for at least those values of X that may be generated by an N/2-bit by N/2-bit signed multiplication to return a value obtained by shifting X by a shift amount to generate a shifted word and saturating said shifted word.

The invention recognises that the provision of a special purpose instruction suitable for dealing with the requirements of a saturated multiply-accumulate operation has significant advantages. More particularly, the timing requirements for the standard desired single cycle multiply are eased with the adjustments required to deal with the saturated nature of the arithmetic being more readily accommodated in the cycles used by the subsequent instruction which performs the accumulate operation. The new instruction is also able to replace the need to define saturating versions of several multiply instructions thereby reducing the opcode bit space and other overhead required to support saturating arithmetic. Finally, the new instruction may be implemented with little additional hardware over that which may be already provided within the system to deal with other aspects of unsaturated and saturated arithmetic.

It will be appreciated that the hardware used to implement the new instruction could take many different forms. The different operations necessary to produce the final result N-bit data word could be grouped in various different ways and performed by different circuit block. These various different alternatives that produce the result N-bit data word with the same final value as given above using a single instruction are all embodiments of the invention.

In an analogous manner to the above described instruction for use in saturated multiply-accumulate operations, similar instructions may also be provided to support saturated multiply-decrement operations.

The shift amount applied by the instructions of the invention may have various different values. However, a shift amount being such that the shifted word is double the first N-bit data operand word P is particularly usefull If an integer multiply is performed on two Q15 numbers, then the normally generated result is a 32-bit "Q30-like" number, for which the ordinary 32-bit signed 2's complement value is regarded as being divided by $2^{30}$ and thus representing numbers from $-2$ to $+(2-2^{-30})$. A Q30-like number may also be considered to be a signed 32-bit fixed point number with 30 binary places. However, what is required for further processing in such circumstances is a Q31 number. In order to deal with this problem, the instruction of the invention may be executed following a standard integer multiply and the shift amount used to double the result of the integer multiply to change it from Q30-like form to Q31 form prior to it being saturated and subject to an accumulate or decrement. Thus, one of the problematic adjustments needed for saturated arithmetic support may be provided with the adjustment to the result of the integer multiply being accommodated within the subsequent instruction rather than having to be provided by the end of the multiply cycle.

Logic circuits for performing saturation can take many different forms. However, in preferred embodiments of the invention saturating said shifted word comprises detecting predetermined characteristics of said first N-bit data operand word P and, if detected, replacing said shifted value with a respective end point value of a range of permitted values.

This feature recognises that in some circumstances saturation can be provided by detecting characteristics of the first N-bit data operand word P as the manipulation to be performed upon it is of a relatively restricted form and so the circumstances that can give rise to an overflow or an underflow requiring saturation may be specifically detected resulting in an overall decrease in hardware requirements.

In particular, when the shift amount being applied doubles the first N-bit data operand word P, then the need for saturation can be detected in an advantageously simply way by comparing the two most significant bits of the first N-bit data operand word P.

Compared to the relatively restricted range of circumstances that can give rise to an overflow or an underflow for the Fun(X) instruction, overflow or underflow for the Sat(X) function can occur more generally and so preferred embodiments of the invention are such that Sat (X) comprises detecting if X lies outside of a range of permitted values and, if detected, replacing X with a respective end point value of said range of permitted values to generate said N-bit result data word R.

Whilst the new instructions of the present invention are advantageous in their own right, they are, as mentioned above, particularly well suited to embodiments in which a multiplier is provided for executing a second instruction word that generates the first N-bit operand data word by multiplying a third N/2-bit data operand word A and a fourth N/2-bit data operand word B.

It is possible to use the instructions of the invention for operands of any sort. However, the instruction is particularly useful in embodiments in which said first N-bit operand data word P, said second N-bit operand data word Q and said result N-bit data word R are signed fixed point data words with the point immediately to the light of the most significant bit position such that $-1 \leq P < +1$, $-1 \leq Q < +1$ and $-1 \leq R < +1$ and Sat (X) is to the range $-1 < X < +1$.

As previously discussed, such QN-type operands require adjustments and saturations that may be efficiently provided by the instructions of the invention without undue impact upon the rest of the data processing system.

The most commonly useful values of the first N-bit data operand word P are those that can be produced by an N/2-bit by N/2-bit sign multiplication. However, preferred embodiments of the invention can expand the functionality of Fun(X) such that it is operative to shift and saturate all N-bit possible values of X.

The invention can be used in systems in which N has various different values. However, DSP operations of the type for which the invention is particularly useful typically require values of N such as N=32.

Whilst it will be appreciated that the invention may be implemented as a system comprising discrete components, it is strongly preferred that the data processing apparatus is implemented as an integrated circuit.

Viewed from another aspect the present invention provides a method of processing data, said method comprising the steps of:

(i) in response to data processing instruction words, generating processing control signals, and (ii) performing data processing operations upon data operand words tinder control of said processing control signals; wherein (iii) in response to a first instruction word, generating control signals to control said processing logic to perform a data processing operation upon a first N-bit data operand word P and a second N-bit data operand word Q to generate a result N-bit data word R as given by:

R=Sat (Fun (P)+Q), where

Sat (X) is a function returning a saturated value of X; and

Fun (X) is a function operative for at least those values of X that may be generated by an N/2-bit by N/2-bit signed multiplication to return a value obtained by shifting, X by a shift amount to generate a shifted word and saturating said shifted word.

Complementary method aspects of the invention are also provided in which the instruction performs a subtract rather than add operation.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
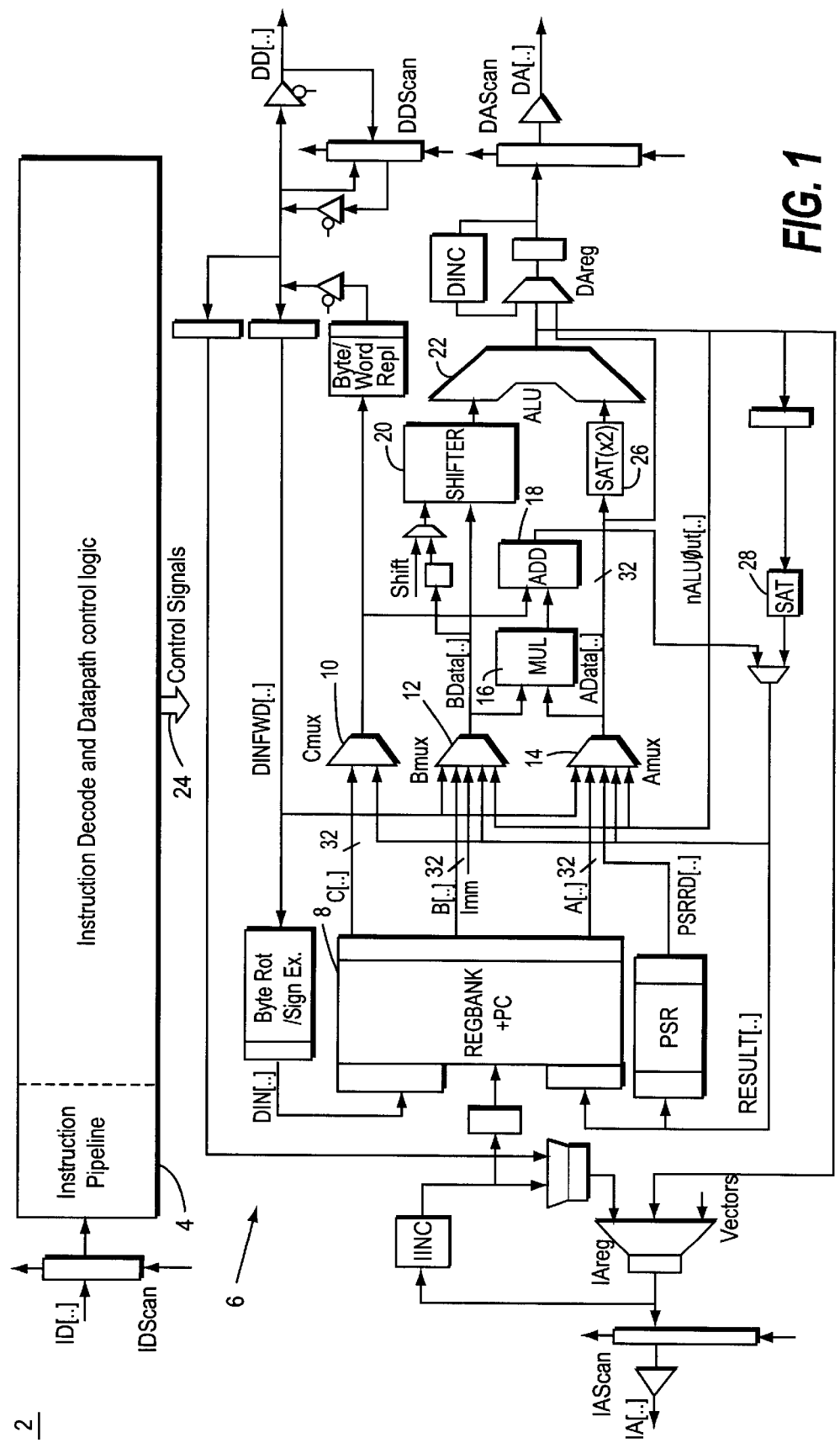
FIG. 1 illustrates the instruction decoder and processing logic within an integrated circuit.

FIG. 1 shows a portion of an integrated circuit 2 (similar to part of an ARM9TDMI microprocessor as produced by ARM Limited of Cambridge, Great Britain) comprising an instruction decoder 4 and processing logic 6. The processing logic 6 is composed of many different separate functional elements. A register bank 8 stores data operand words (P, Q) to be manipulated. These words may be read from the register bank 8 and supplied via multiplexers 10, 11, 14 to various other processing units within the processing logic 6. An integer multiplier 16 is provided for performing signed integer multiplication amongst other functions. An adder 18 is provided for performing unsaturated multiply-accumulate operations, and for converting the multiplier result from carry-save to 2's complement format. A shifter 20 and an arithmetic logic unit 22 are also provided. The above mentioned basic components of the processing logic 6 are generally known. Control signals 24 from the instruction decoder 4 are applied to the various elements within the processing logic 6 to control and co-ordinate their operation. More particularly, when an instruction is decoded by the instruction decoder, control signals 24 are output to switch the various multiplexers within the processing logic 6 to select the desired data path and to activate and configure the various processing units within the processing logic 6 to perform the operation specified by the decoded instruction. For clarity, the signal lines joining the individual components to the instruction decoder are omitted from the diagram.

In order to support additional instructions for saturated arithmetic (QDADD, QDSUB and QDRSB), a shifting and saturating unit 26 is provided upstream of the arithmetic logic unit 22 and a full saturating unit 28 is provided on a feedback path to the register bank 8, in the next pipeline stage after the one in which the arithmetic logic unit 22 operates. In operation, the shifting and saturating unit 26 first checks to determine whether the most significant two bits of the 32-bit data word input to it are unequal. If this condition is detected, then a left shift by one bit will result in an overflow or an underflow when that input data word represents a Q30-like word that is to be converted to a Q31 word by the left shift. If the two most significant bits are "01", then the shifting and saturating unit 26 outputs 0x7FFFFFFF representing the maximum end point of the range of permitted values. Similarly, if the two most significant bits are "10", then the shifting and saturating unit 26 outputs 0x80000000 representing the minimum end point of the permitted range of values. If neither of these conditions is detected, then the shifting and saturating unit 26 left shifts the input binary data value by 1 bit position corresponding to a doubling of its value and accordingly transforms a Q30-like representation obtained by an integer multiply of a Q15 by Q15 number into a Q31 representation as required for filer processing (e.g. an accumulate) and saturation.

The shifting and saturating unit 26 is provided with a bypass route such that it can be switched out of operation in response to an appropriate control signal 24 from the instruction decoder 4 when the particular instruction being decoded does not require this operation. The shifting and saturating unit 26 is positioned on the A bus and this bus normally has fewer timing constraints than the B bus since the B bus includes the shifter 20. Accordingly, the shifting and saturating unit 26 does not cause any significant additional timing problems.

A full saturating unit 28 is provided upon the return path for use after the arithmetic logic unit 22 has performed the required addition or subtraction. The full saturating unit 28 can operate in accordance with known principles to detect an overflow or an underflow of the signed result produced by the arithmetic logic unit 22 and correct it to the appropriate maximum or minimum end point value of the range of permitted values. Like the shifting and saturating unit 26, the full saturating unit 28 is provided with a bypass route such that it can be switched out of operation in response to an appropriate control signal 24 when this saturation is not required. Because the full saturating unit 28 is in a pipeline stage which normally does nothing for addition and subtraction instructions, this does not add any timing problems. It does however require that the processor should interlock for one cycle if the result of a saturating instruction is used by the immediately following instruction. This interlock can be handled in a manner analogous to the interlocks generated on many microprocessors if the value loaded by a load instruction is used by the immediately following instruction.

in overall operation, in order to perform a Q15 by Q15 multiply together with a Q31 accumulate operation, the processing proceeds as follows. Initially the Q15 values from the register bank 8 are read out upon bus A and bus B and fed as inputs to the single cycle integer multiplier 16. The result, which is in Q30-like form, is fed back to the register bank 8. On a subsequent processing cycle one of the new instructions is executed (e.g. a QDADD instruction) to read out the Q30-like result of the multiply on the A bus and the Q31 accumulate value on the B bus. The Q30-like value is then left shifted by one or saturated by the shifting and saturating unit 26 and supplied as one input to the arithmetic logic unit 22. The Q31 value on the B bus is supplied as the other input to the arithmetic logic unit 22 by using appropriate control signals 24 to cause the shifter 20 not to shift its input value. The shifting and saturating unit 26 has corrected the Q30-like value into the required saturated Q31 value and this is added to the Q31 value on the B bus by the arithmetic logic unit 22. The output from the arithmetic logic unit 22 is then supplied to the full saturating unit 28 where it is subject to a Q31 saturation by detecting overflow and underflow flags and other standard conditions from the arithmetic logic unit 22 prior to being stored back into the register bank 8. Instead of the arithmetic logic unit 22 performing an addition, it may be controlled by appropriate control signals 24 to subtract the A bus value from the B bus value in a QDRSB instruction or subtract the B bus value from the A bus value in a QDSUB instruction. The configuration of the arithmetic logic unit to perform subtractions in response to appropriate control signals 24 from the instruction decoder may be implemented in various standard ways.

It will be seen form the above that the operations performed by the QDADD, QDSUB and QDRSB instructions have been divided in different ways between the various functional units within the processing logic. Those skilled in the art will recognise that the division of these operations between the various units could take place in many different ways whilst still producing the same end result.

Figure 2:
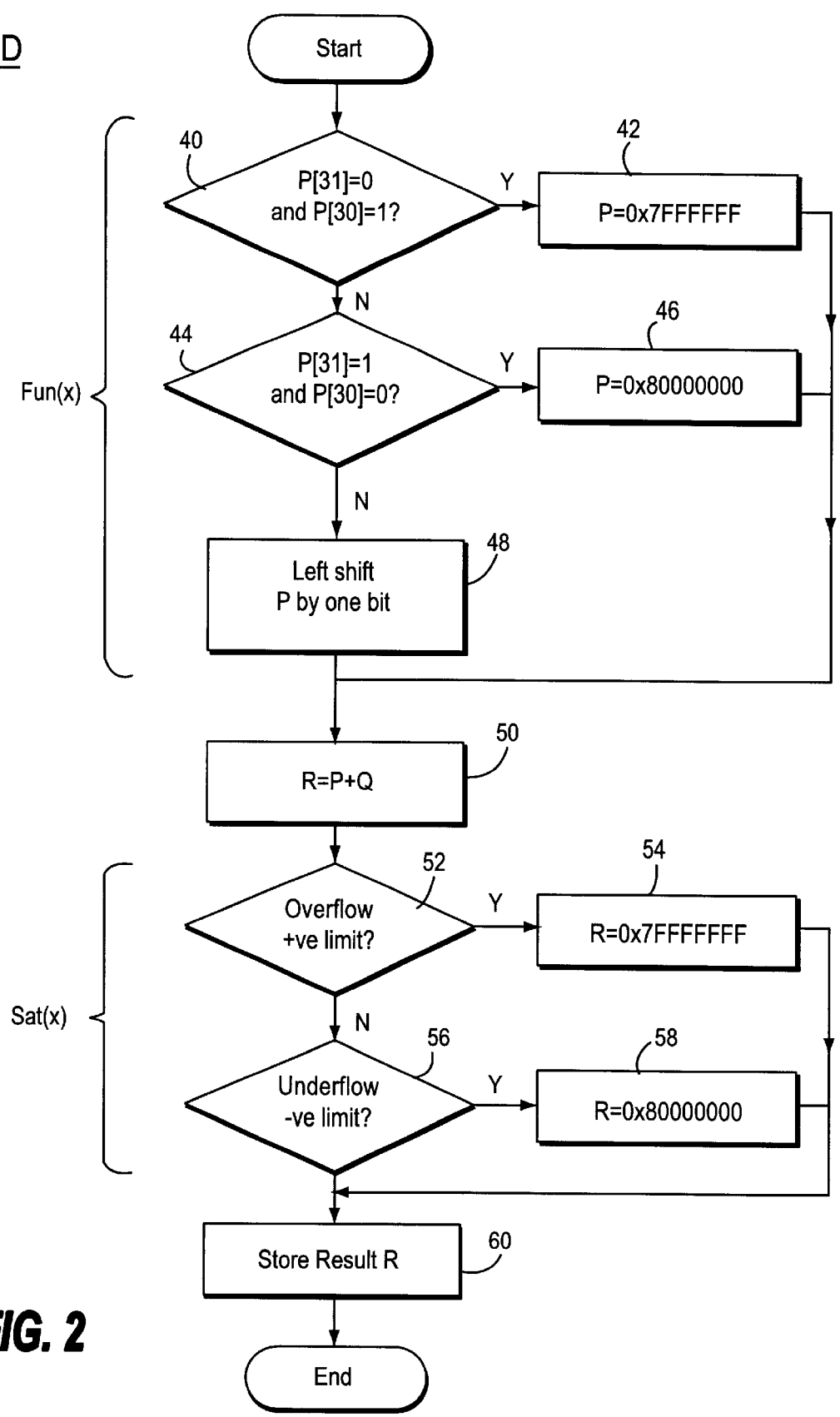
FIGS. 2, 3 and 4 are flow diagrams illustrating the operation of instructions provided to support saturated arithmetic.

FIG. 2 is a flow diagram illustrating the processing steps performed in a QDADD instruction. In step 40 a test is made as to whether the most significant two bits of the first 32-bit operand data word are equal to "01". If this is the case, then a left shift by 1 will result in an overflow and accordingly step 42 is used to set the value to the maximum permitted positive value $(+1-2^{31})$. Similarly, step 44 checks to see if the two most significant bits are "10" indicating that a left shift will result in an underflow. In this case, if detected, step 46 sets the value to the minimum permitted value of −1.

If neither an overflow nor an underflow condition is detected, then step 48 left shifts the first 32-bit operand data word by one bit position thereby converting it from Q30-like form to Q31 form if that is what the number is representing. The operation of steps 40 to 48 corresponds to the functions provided by the shifting and saturating unit 26 and the Fun(X) function described earlier.

At step 50 an addition is performed. This addition corresponds to the addition performed by the arithmetic logic unit 22 in FIG. 1.

Steps 52 and 54 detect and deal with an overflow in a saturated value resulting from the additional step 50. Similarly, steps 56 and 58 deal with an underflow. If neither an overflow or an underflow is detected, then no correction is applied. The result R of the QDADD instruction is stored back into a register within the register bank 8 at step 60.

The operation performed by the steps 52 to 58 corresponds to that provided by the fill saturating unit 28 in FIG. 1 and the Sat(X) function discussed above.

Figure 3:
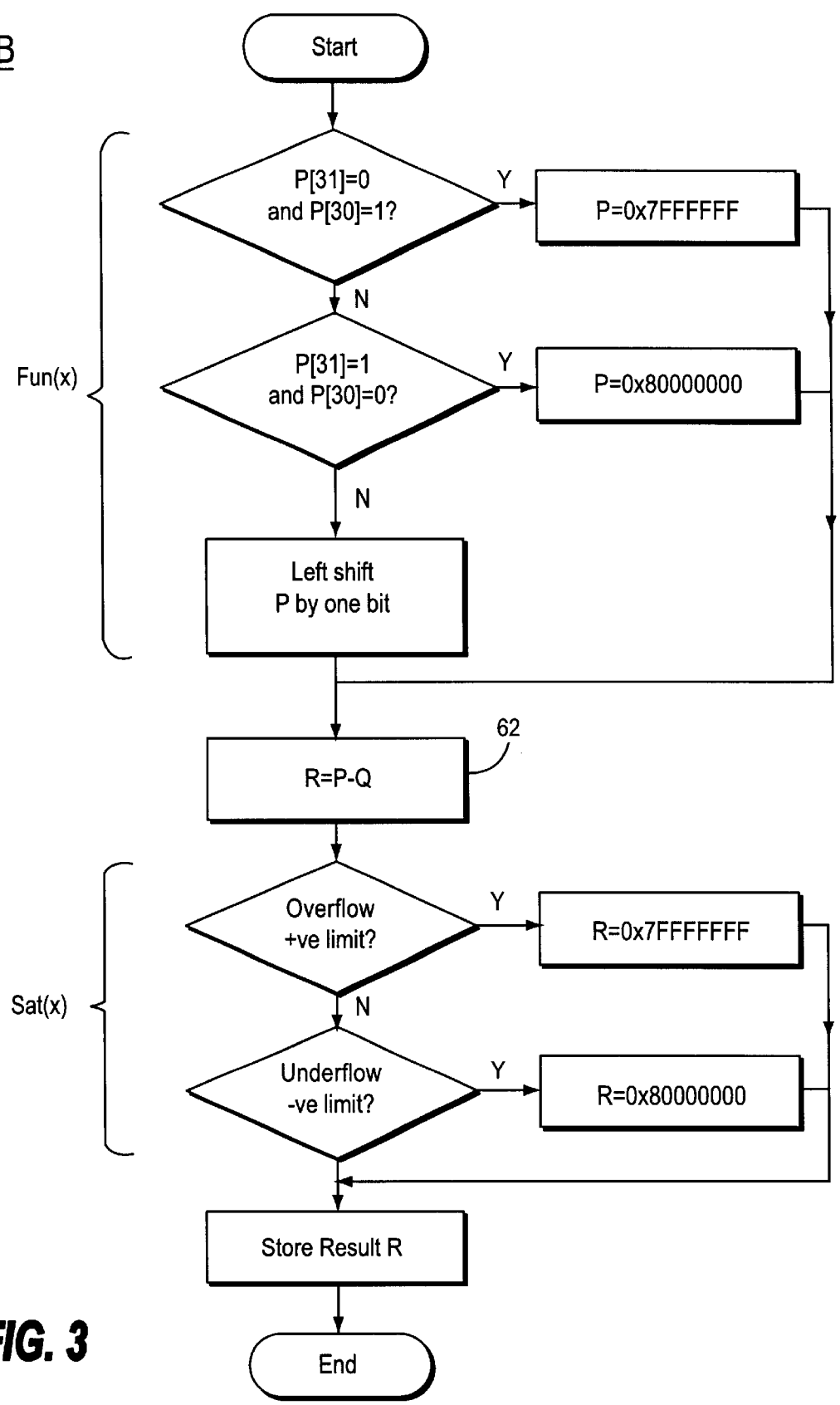

FIG. 3 illustrates a similar flow diagram but in this case for a QDSUB instruction. In this instruction, the step 50 of FIG. 2 is replaced by a step 62 in which the second 32-bit operand data word Q is subtracted from the shifted and saturated first operand data word P.

Figure 4:
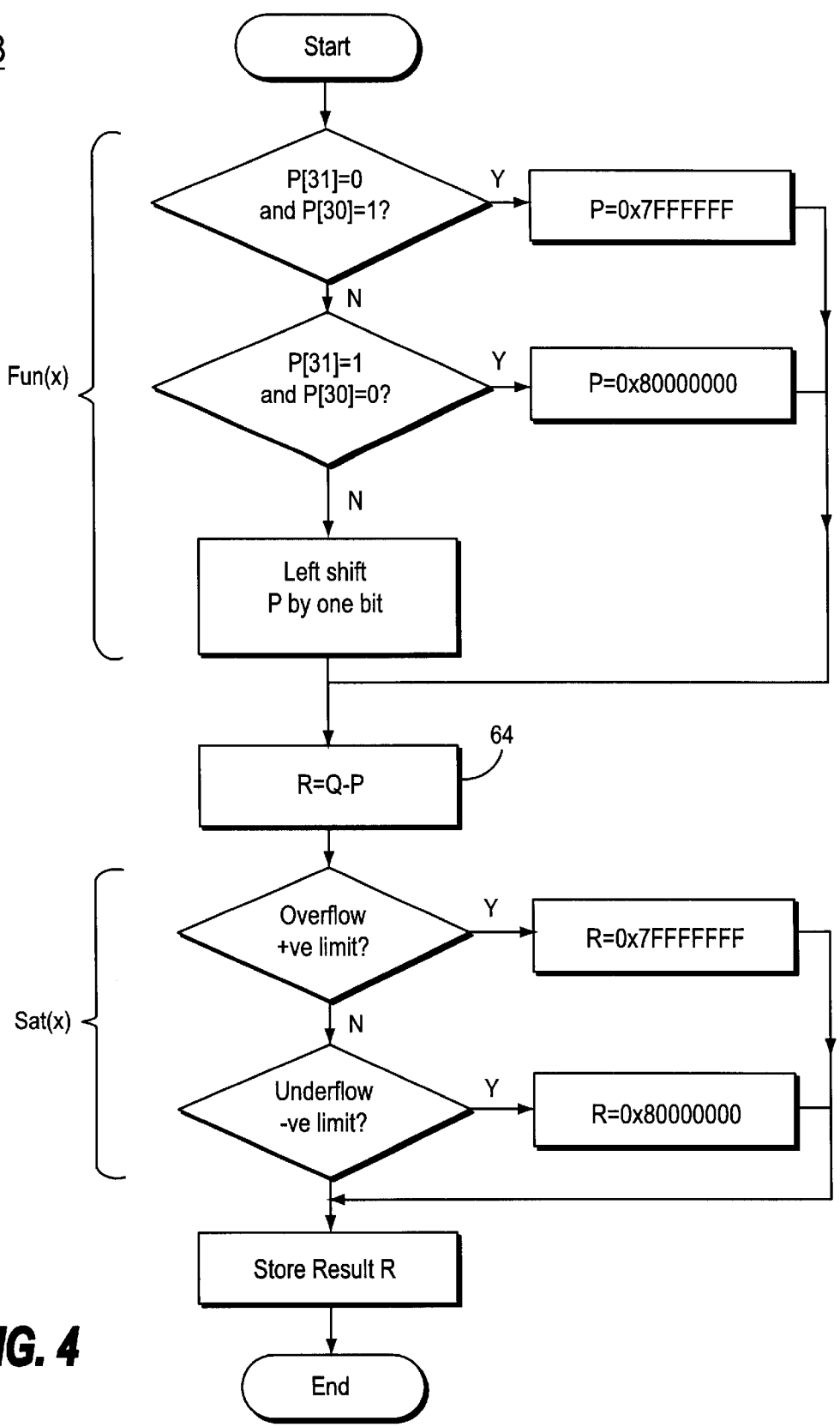

FIG. 4 is similar to FIG. 3 but in this case the order of the subtraction that takes place in step 62 of FIG. 3 has been reversed in step 64 of FIG. 4.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. Data processing apparatus comprising:
   (i) an instruction decoder responsive to data processing instruction words to generate processing control signals; and
   (ii) processing logic controlled by said processing control signals to perform data processing operations upon data operand words; wherein
   (iii) said instruction decoder is responsive to a first instruction word to generate control signals to control said processing logic to perform a data processing operation upon a first N-bit data operand word P and a second N-bit data operand word Q to generate a result N-bit data word R as given by:

R=Sat(Fun(P)+Q), where
   Sat (X) is a function returning a saturated value of X; and
   Fun (X) is a function operative for at least those values of X that may be generated by an N/2-bit by N/2-bit signed multiplication to return a value obtained by shifting X by a shift amount to generate a shifted word and saturating said shifted word.

2. Data processing apparatus as claimed in claim 1, wherein said shift amount is such that said shifted word is double said first N-bit data operand word P.

3. Data processing apparatus as claimed in claim 2, wherein saturating said shifted word comprises detecting predetermined characteristics of said first N-bit data operand word P and, if detected, replacing said shifted value with a respective end point value of a range of permitted values, said first N-bit data operand word is a signed value and said predetermined characteristic is non-equality of the two most significant bits of said first N-bit data operand word P.

4. Data processing apparatus as claimed in claim 1, wherein saturating said shifted word comprises detecting predetermined characteristics of said first N-bit data operand word P and, if detected, replacing said shifted value with a respective end point value of a range of permitted values.

5. Data processing apparatus as claimed in claim 1, wherein Sat (X) comprises detecting if X lies outside of a range of permitted values and, if detected, replacing X with a respective end point value of said range of permitted values to generate said N-bit result data word R.

6. Data processing apparatus as claimed in claim 1, wherein said processing logic includes a multiplier and said first N-bit operand data word P is a multiply result generated by a signed multiply of a third N/2-bit data operand word A and a fourth N/2-bit data operand word B in response to a second instruction word.

7. Data processing apparatus as claimed in claim 1, wherein said first N-bit operand data word P, said second N-bit operand data word Q and said result N-bit data word R are signed fixed point data words with the point immediately to the right of the most significant bit position such that $-1 \leq P < +1$, $-1 \leq Q < +1$ and $-1 \leq R < +1$ and Sat (X) is to the range $-1 \leq X < +1$.

8. Data processing apparatus as claimed in claim 1, wherein Fun (X) is a function operative for all N-bit values of X to return a value obtained by shifting X by a shift amount to generate a shifted word and saturating said shifted word.

9. Data processing apparatus as claimed in claim 1, wherein N=32.

10. Data processing apparatus as claimed in claim 1, wherein said data processing apparatus comprises an integrated circuit.

11. Data processing apparatus comprising:
    (i) an instruction decoder responsive to data processing instruction words to generate processing control signals; and
    (ii) processing logic controlled by said processing control signals to perform data processing operations upon data operand words; wherein
    (iii) said instruction decoder is responsive to a first instruction word to generate control signals to control said processing logic to perform a data processing operation upon a first N-bit data operand word P and a second N-bit data operand word Q to generate a result N-bit data word R as given by:

R=Sat(Fun(P)−Q), where
    Sat (X) is a function returning a saturated value of X; and
    Fun (X) is a function operative for at least those values of X that may be generated by an N/2-bit by N/2-bit signed multiplication to return a value obtained by shifting X by a shift amount to generate a shifted word and saturating said shifted word.

12. Data processing apparatus comprising:
    (i) an instruction decoder responsive to data processing instruction words to generate processing control signals; and
    (ii) processing logic controlled by said processing control signals to perform data processing operations upon data operand words; wherein
    (iii) said instruction decoder is responsive to a first instruction word to generate control signals to control said processing logic to perform a data processing operation upon a first N-bit data operand word P and a second N-bit data operand word Q to generate a result N-bit data word R as given by:

R=Sat(Q−Fun(P)), where
    Sat (X) is a function returning a saturated value of X; and
    Fun (X) is a function operative for at least those values of X that may be generated by an N/2-bit by N/2-bit signed multiplication to return a value obtained by shifting X by a shift amount to generate a shifted word and saturating said shifted word.

13. A method of processing data, said method comprising the steps of:
    (i) in response to data processing instruction words, generating processing control signals; and
    (ii) performing data processing operations upon data operand words under control of said processing control signals; wherein
    (iii) in response to a first instruction word, generating control signals to control said processing logic to perform a data processing operation upon a first N-bit data operand word P and a second N-bit data operand word Q to generate a result N-bit data word R as given by:

R=Sat(Fun(P)+Q), where
    Sat (X) is a function returning a saturated value of X; and Fun (X) is a function operative for at least those values of X that may be generated by an N/2-bit by N/2-bit signed multiplication to return a value obtained by shifting X by a shift amount to generate a shifted word and saturating said shifted word.

14. A method of processing data, said method comprising the steps of:
   (i) in response to data processing instruction words, generating processing control signals; and
   (ii) performing data processing operations upon data operand words under control of said processing control signals; wherein
   (iii) in response to a first instruction word, generating control signals to control said processing logic to perform a data processing operation upon a first N-bit data operand word P aid a second N-bit data operand word Q to generate a result N-bit data word R as given by:

Sat(Fun(P)−Q ), where
   Sat (X) is a function returning a saturated value of X; and
   Fun (X) is a function operative for at least those values of X that may be generated by an N/2-bit by N/2-bit signed multiplication to return a value obtained by shifting X by a shift amount to generate a shifted word and saturating said shifted word.

15. A method of processing data, said method comprising the steps of:
   (i) in response to data processing instruction words, generating processing control signals; and
   (ii) performing data processing operations upon data operand words under control of said processing control signals; wherein
   (iii) in response to a first instruction word, generating control signals to control said processing logic to perform a data processing operation upon a first N-bit data operand word P and a second N-bit data operand word Q to generate a result N-bit data word R as given by:

R=Sat(Q−Fun(P)), where
   Sat (X) is a function returning a saturated value of X; and
   Fun (X) is a function operative for at least those values of X that may be generated by an N/2-bit by N/2-bit signed multiplication to return a value obtained by shifting X by a shift amount to generate a shifted word and saturating said shifted word.

* * * * *